(12) United States Patent
Ostertag et al.

(10) Patent No.: US 12,459,346 B2
(45) Date of Patent: Nov. 4, 2025

(54) MIDFLOOR MODULE FOR A MOTOR VEHICLE, CORRESPONDING MOTOR VEHICLE, AND METHOD FOR MANUFACTURING THE LATTER

(71) Applicant: Dr. Ing. h.c. F. Porsche Aktiengesellschaft, Stuttgart (DE)

(72) Inventors: Jasmin Ostertag, Stuttgart (DE); Erwin Goetz, Weil der Stadt (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 330 days.

(21) Appl. No.: 18/138,986

(22) Filed: Apr. 25, 2023

(65) Prior Publication Data

US 2023/0356582 A1    Nov. 9, 2023

(30) Foreign Application Priority Data

May 9, 2022    (DE) ..................... 10 2022 111 424.4

(51) Int. Cl.
| | |
|---|---|
| *B60K 6/405* | (2007.10) |
| *B60K 15/063* | (2006.01) |
| *B60K 15/067* | (2006.01) |
| *B60R 16/023* | (2006.01) |
| *B62D 21/15* | (2006.01) |
| *B60K 15/03* | (2006.01) |

(52) U.S. Cl.
CPC ............ *B60K 6/405* (2013.01); *B60K 15/067* (2013.01); *B60R 16/0238* (2013.01); *B62D 21/15* (2013.01); *B60K 2015/03118* (2013.01); *B60K 2015/0634* (2013.01); *B60Y 2200/92* (2013.01); *B60Y 2400/10* (2013.01); *B60Y 2400/112* (2013.01)

(58) Field of Classification Search
CPC ............... B60K 6/405; B60K 15/067; B60K 2015/03118; B60K 2015/0634; B60R 16/0238; B60Y 2200/92; B60Y 2400/10
USPC ......................................................... 180/68.5
See application file for complete search history.

(56) References Cited

U.S. PATENT DOCUMENTS

| | | | |
|---|---|---|---|
| 9,085,226 B2* | 7/2015 | Matsuda | B60K 6/40 |
| 9,499,205 B1* | 11/2016 | Elia | B62D 21/15 |
| 9,925,890 B2* | 3/2018 | Enning | B60L 50/64 |
| 11,230,177 B2* | 1/2022 | Kim | B60K 1/04 |
| 11,235,670 B2* | 2/2022 | Yang | B60L 50/66 |

(Continued)

FOREIGN PATENT DOCUMENTS

| | | |
|---|---|---|
| DE | 102011122101 | 9/2012 |
| DE | 102011112648 | 3/2013 |

(Continued)

OTHER PUBLICATIONS

German Search Report dated Aug. 9, 2022.

*Primary Examiner* — Hau V Phan
(74) *Attorney, Agent, or Firm* — Gerald E. Hespos; Michael J. Porco

(57) ABSTRACT

A midfloor module (10, 11) for a motor vehicle has a frame structure (10) with a battery frame (10). The battery frame (10) has multiple battery modules (11), and multiple tank volumes (1, 2, 2+) that can be used optionally for fuel. A motor vehicle that is equipped with such a midfloor module (10, 11) also is provided as well as a method for manufacturing the midfloor module (10,11).

9 Claims, 7 Drawing Sheets

(56) References Cited

U.S. PATENT DOCUMENTS

| | | | | |
|---|---|---|---|---|
| 2013/0020139 | A1* | 1/2013 | Kim | B60K 1/04 |
| | | | | 903/952 |
| 2015/0194712 | A1* | 7/2015 | He | H01M 10/6551 |
| | | | | 429/82 |
| 2015/0219132 | A1* | 8/2015 | Lacroix | F16L 55/035 |
| | | | | 24/455 |
| 2017/0106744 | A1* | 4/2017 | Ajisaka | B60K 1/04 |
| 2018/0062225 | A1* | 3/2018 | You | H01M 10/6554 |
| 2019/0225110 | A1* | 7/2019 | Zenner | B60L 58/26 |
| 2021/0273279 | A1 | 9/2021 | Hettenkofer et al. | |
| 2021/0300168 | A1* | 9/2021 | Kohara | B60K 17/22 |
| 2022/0081040 | A1* | 3/2022 | Choi | B62D 21/03 |
| 2022/0105991 | A1* | 4/2022 | Kim | B62D 25/20 |

FOREIGN PATENT DOCUMENTS

| | | |
|---|---|---|
| DE | 102016007124 | 2/2017 |
| DE | 102017213816 | 2/2019 |
| DE | 102018209693 | 12/2019 |
| DE | 102019211009 | 1/2021 |

\* cited by examiner

MIDFLOOR MODULE FOR A MOTOR VEHICLE, CORRESPONDING MOTOR VEHICLE, AND METHOD FOR MANUFACTURING THE LATTER

CROSS REFERENCE TO RELATED APPLICATION

This application claims priority on German Patent Application No 10 2022 111 424.4 filed May 9, 2022, the entire disclosure of which is incorporated herein by reference.

BACKGROUND

Field of the Invention. The invention relates to a midfloor module for a motor vehicle as well as a motor vehicle equipped with a midfloor module and a method for manufacturing the midfloor module.

Related Art. A platform in vehicle technology is defined as any technical base on which vehicle models that differ externally are constructed. A platform from the prior art typically includes an energy store, electronics, and other components in addition to the assemblies of the body.

A prior art platform for battery-electric motor vehicles has the propulsion battery arranged in a stable frame of the floor group between the axles and is known as a modular e-drive or electrification kit (German: MEB). The MEB is designed for purely electric vehicles (e-vehicles) and thus is unsuitable for hybrid forms of propulsion.

A restricted e-platform has limited profitability from the perspective of an original equipment manufacturer (OEM). In addition, the ranges required by users and achievable by different propulsion concepts sometimes differ greatly.

DE 102011112648 A1, DE 102016007124 A1, DE 102017213816 A1, and DE 102018209693 A1 disclose modular housings that can accommodate a traction battery or a fuel tank depending on the propulsion variant of the vehicle. DE 102011122101 A1 discloses different combinations of the traction battery and the fuel tank arranged longitudinally within and on both sides of the mid-tunnel centrally and at the rear of the vehicle. US2021/0273279 describes a similar arrangement, where batteries on both sides of the mid-tunnel and fuel tank are provided in a rear part of the vehicle.

SUMMARY OF THE INVENTION

The invention provides a midfloor module for a motor vehicle, a corresponding motor vehicle, and a method for manufacturing the motor vehicle.

The module is based on the idea that a battery frame accommodated in the midfloor can also be used to hold energy stores, e.g. fuel tanks, fuel cells, hydrogen tanks, etc. The spatial division between different energy stores can thus be defined variably for each vehicle concept.

The invention provides OEMs with the ability to use modules across platforms for multiple types of propulsion. The body shell and the midfloor module are designed for the worst-case crash event, so that when using other media and volumes, no new safety or crash tests are required. In this way, the invention enables OEMs to design production sites as flexibly as possible to produce both conventional as well as plug-in hybrid vehicles and purely electrically propelled vehicles at any location. In this way, production can be adjusted optimally even when less expected scenarios occur and ensures the best responsiveness through high flexibility.

A region that can be used optionally for fuel or further battery modules may be provided in addition to a region of the midfloor module reserved for the battery. Regions of the midfloor module can also be used deliberately for clearances in the vehicle interior (foot garage) or for crash-relevant connections (seat). This enables users to retrofit the vehicle to their practical needs with the aid of replacement modules in customer service, for example by installing a more powerful battery or a larger fuel tank at the expense of the battery. The midfloor module concept enables technological strokes in the energy stores to be responded to.

The midfloor module including the battery can be preassembled, and the pre-assembled midfloor module can be joined into the motor vehicle, and the region optionally is used for the fuel or for further battery modules as described above. In pre-assembly, different energy stores can be realized with one assembly concept. Further, the platform can be introduced into the vehicle in a single step to produce a hybrid or pure electric vehicle on a case-by-case basis depending on the desired range and usage scheme, without any local access restrictions. Thus, a plug-in hybrid vehicle with a large traction battery and a small fuel tank for an internal combustion engine range extender is as viable as a range-optimized plug-in hybrid vehicle with a small traction battery and a large fuel tank for an electromotive range extender.

This approach offers special advantages, for example in a passenger car floor group with a midtunnel. Such a mound between the seats in older, standard-drive vehicles houses the cardan shaft from the front engine to the driven rear axle, but also can serve to stiffen the body and accommodate the exhaust system, switch linkages, cooling lines, brakes, or battery modules. Many e-vehicles have a midtunnel, although it is not required for structural reason or for stiffness. In this case, the floor module carrying the tunnel can comprise a tank bladder in its variable region, which, in addition to the volume between its battery modules, fills the additional volume in the unused midtunnel. At the same time, the midtunnel can be used in a known manner to implement storage concepts for the passengers.

DETAILED DESCRIPTION

Figure 1:
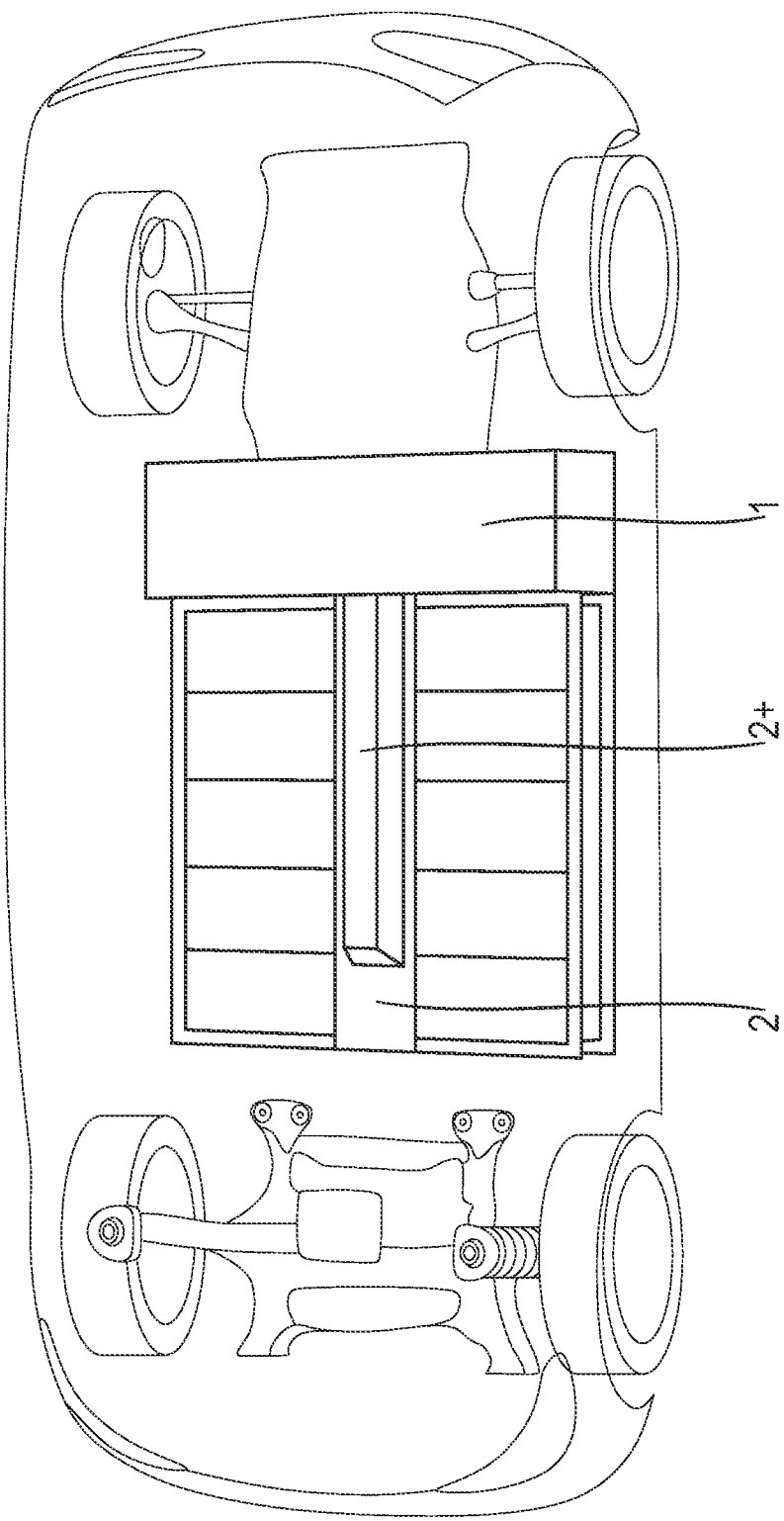
FIG. 1 is a schematic illustration of the invention using the MEB platform.
Figure 2:
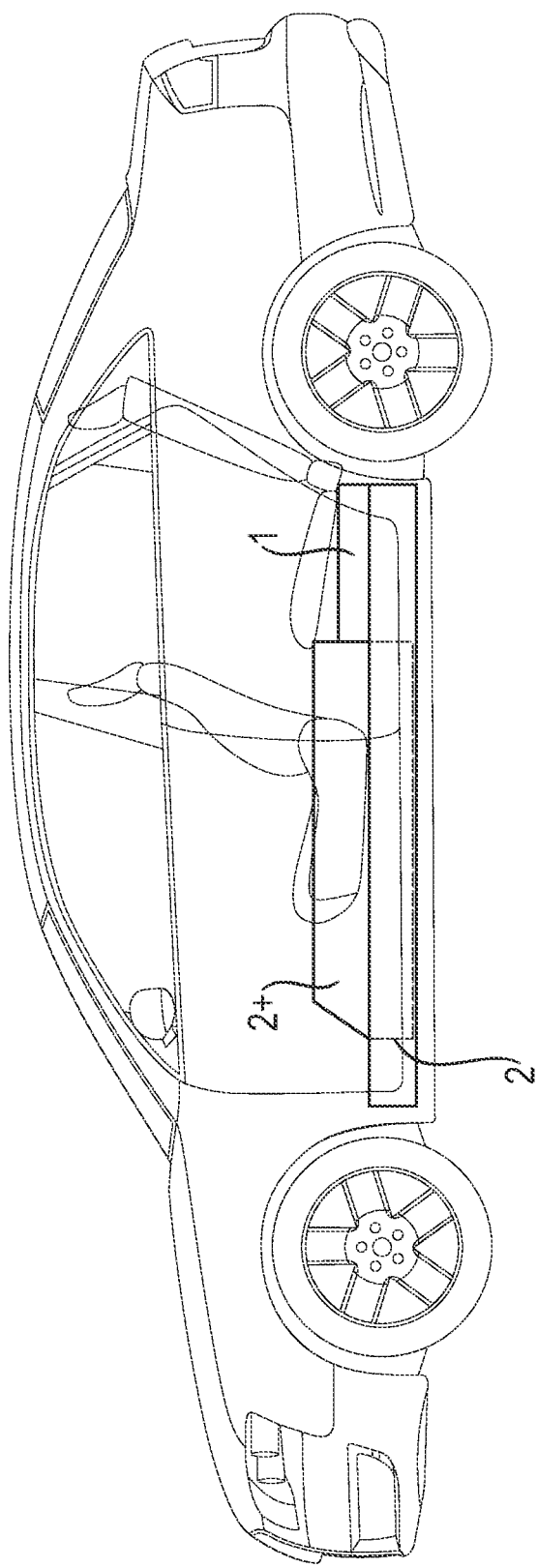
FIG. 2 is the partially transparent side view of a motor vehicle with a midtunnel.
Figure 3:
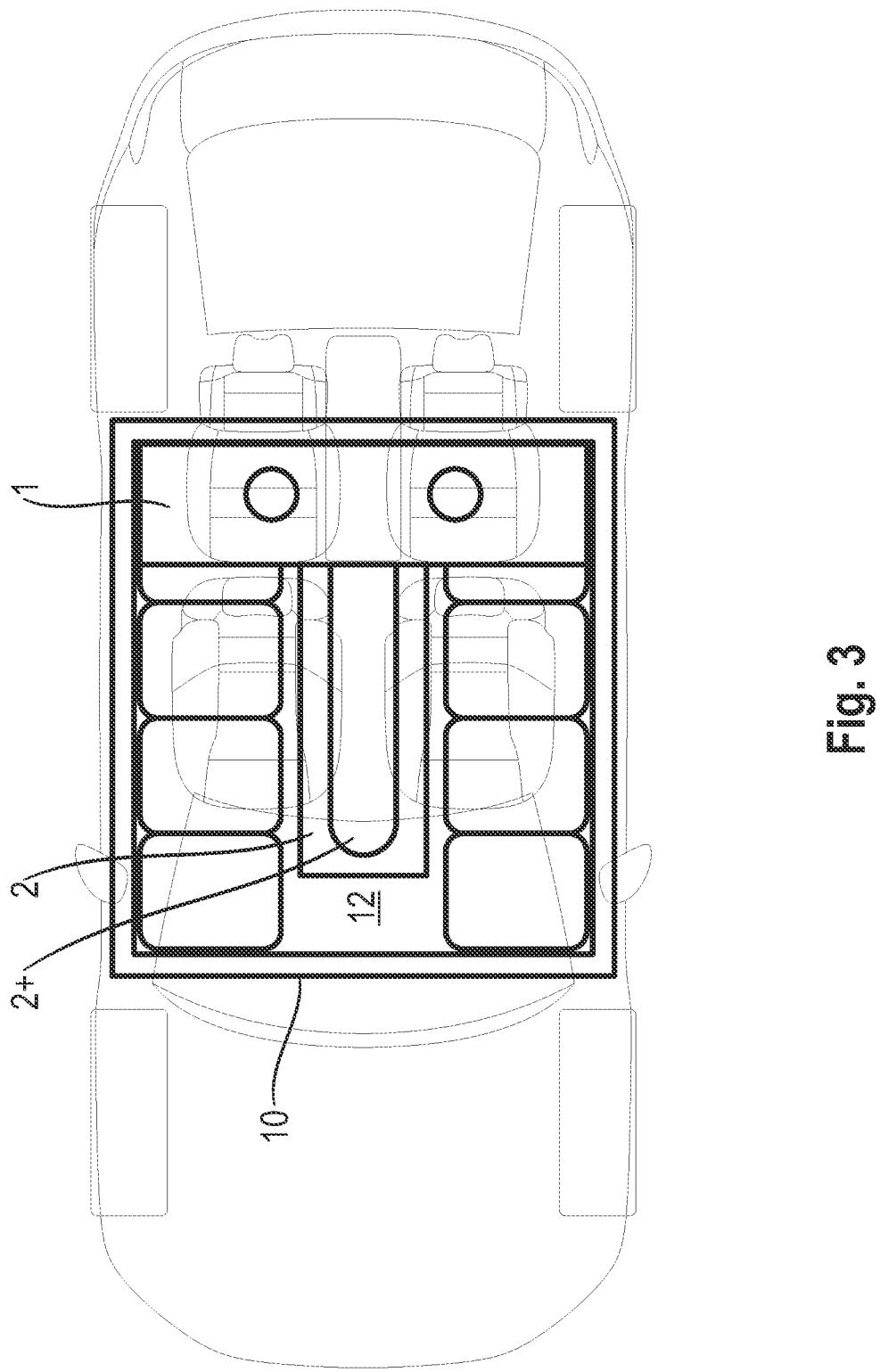
FIG. 3 is a partially transparent top view of the motor vehicle.

FIGS. 1 to 3 illustrate the basic concept of the invention based on the midfloor of a floor group that can be formed with or without a tunnel, depending on the desired structural stiffness. A first tank volume (1) of the structure describes the design space under the rear bench; access points to the fuel pump and the indicator unit are realized by shell openings. A second tank volume (2) describes the freely definable region (20) in the center of the vehicle that has a planar floor without a midtunnel. A floor group with a midtunnel and having an additional volume (2+) available for the extension of the second tank volume (2).

As shown in FIG. 3, the structure of the midfloor also comprises a battery frame (10) that completely encompasses the tank volumes (1, 2, 2+) in the top view. The function of the battery frame (10) can be seen in FIG. 4 in full, which contrasts the X-section (shown at left) of the vehicle at the height of its driver's seat with an X-section (shown at right) at the height of the rear seat. For example, the battery frame (10) comprises two rows of battery modules (11) including the second tank volume (2) along with any additional volume (2+) between them. Thus, a region (20) of the midfloor that can be designed for the benefit of the preferred energy store (2, 2+, 10) and can also be used optionally for fuel, for example in a tank bladder that fills the second tank volume (2) and an additional volume (2+), or for further battery modules (11).

Figure 5:
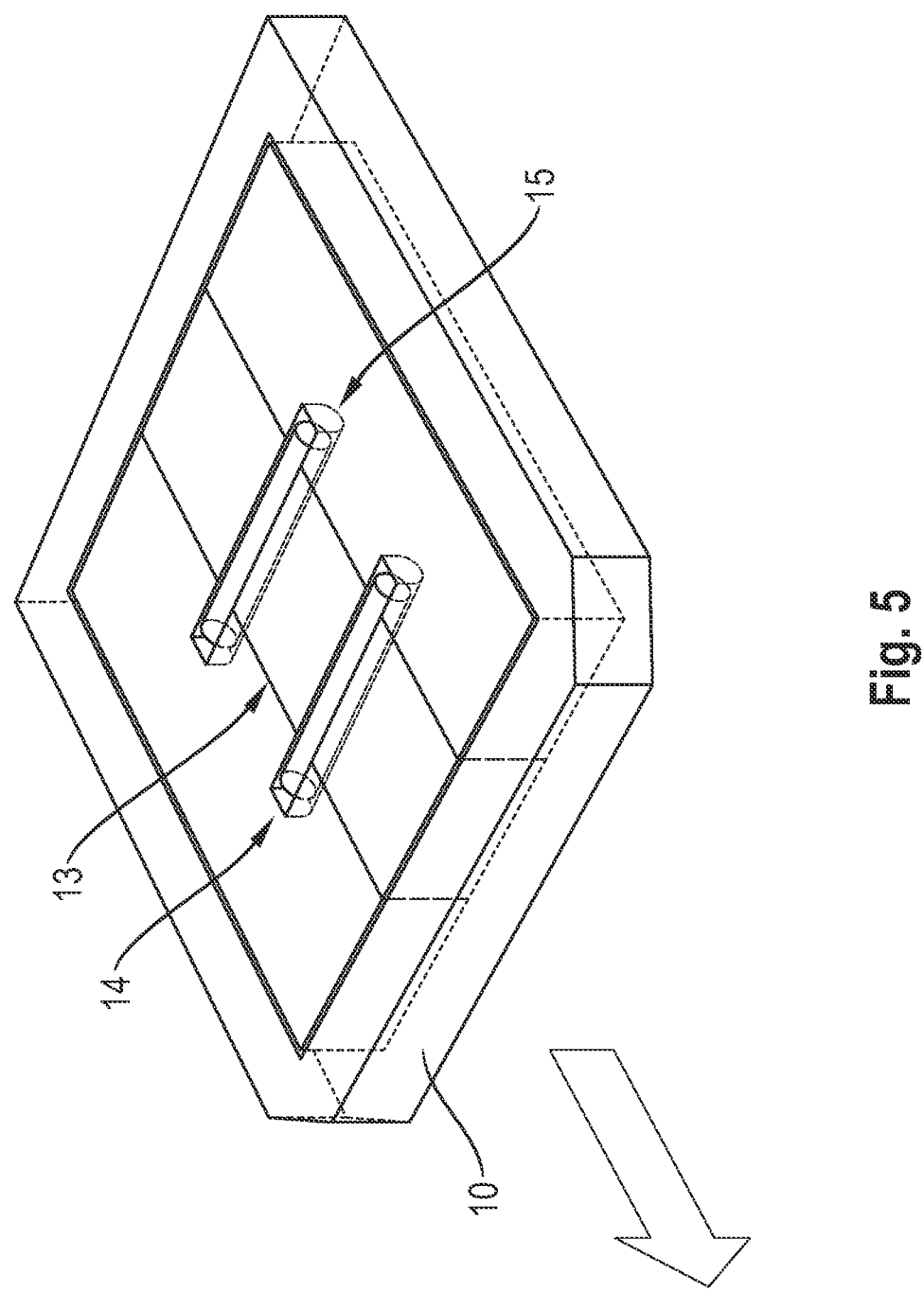
FIG. 5 shows a configuration with a planar floor and an energy store.
Figure 6:
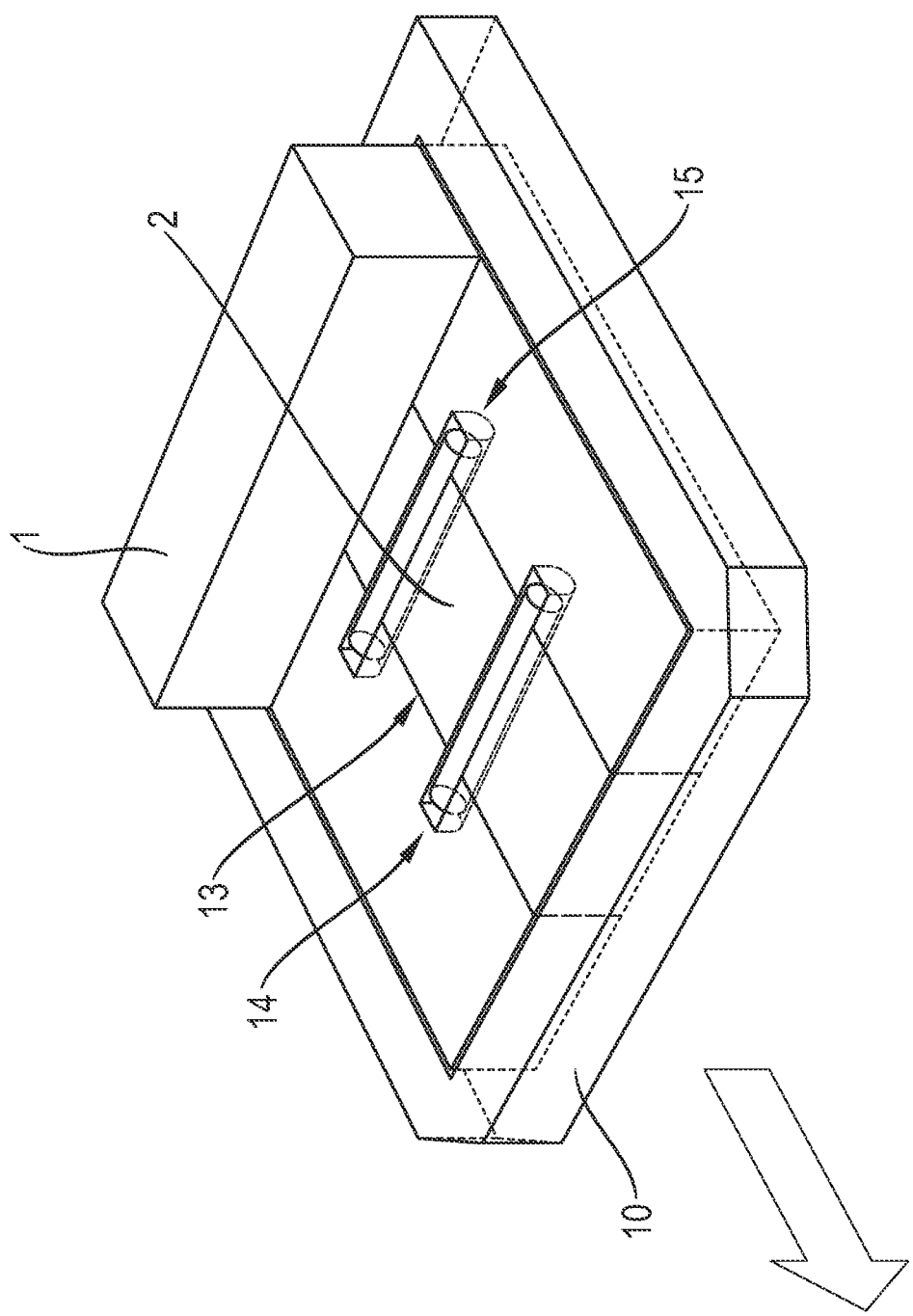
FIG. 6 shows a planar floor and two fuel tanks.
Figure 7:
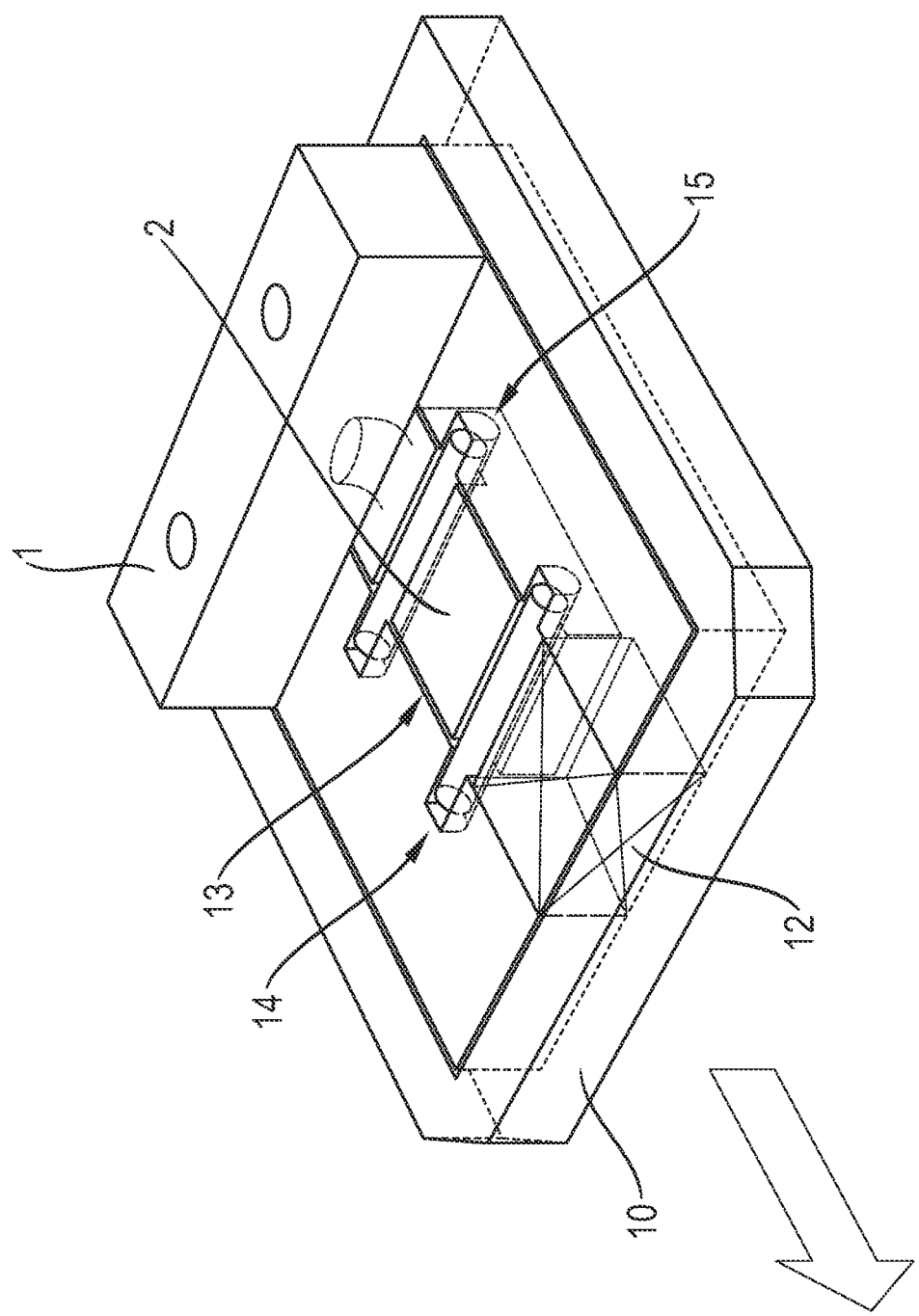
FIG. 7 shows a configuration with a planar floor and different types of energy stores.

This design flexibility is shown in FIGS. 5 to 7 using a vehicle with a planar floor and without a midtunnel.

The framework structure is designed with a view towards maximum flexibility; however, it also meets the strictest crash requirements. In this aspect, FIG. 5 directs the attention of the viewer to the truss (13, 14) of the frame structure (10, 13, 14). In the present case, it has a longitudinal structure (13) stiffened by the battery (not shown in detail here) as well as a transverse structure (14) formed by stiffenings (15) that impart its overall structure to the truss (13, 14). It is immediately discernible that such a truss (13, 14) may also be used in a floor group with a midtunnel without leaving the scope of the invention.

Figure 4:
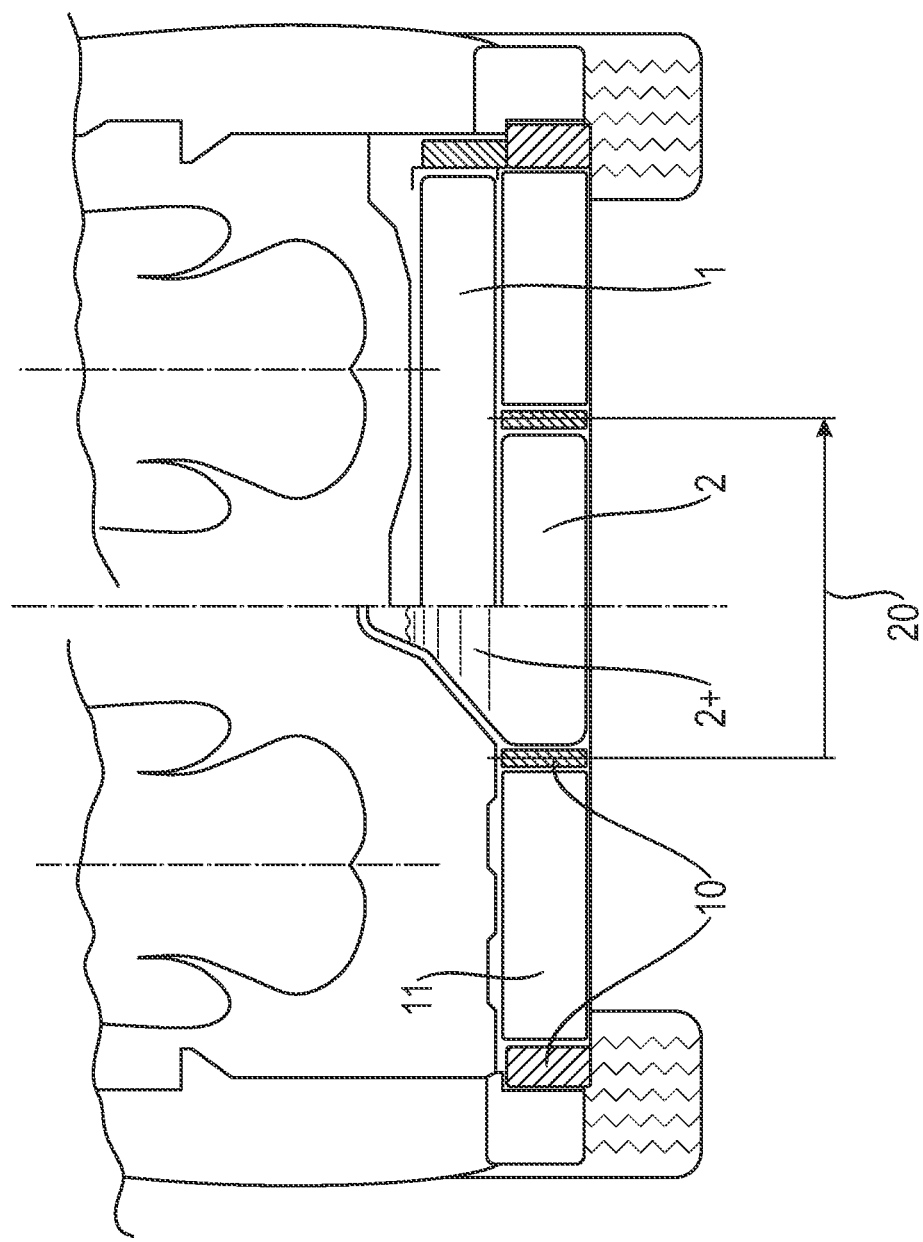
FIG. 4 shows a section that illustrates the invention perpendicular to the roll axis ("X-cut").

The configuration of FIG. 5 is compatible with the implementation of an energy store, the frame structure (10, 13, 14) shown in FIG. 6 accommodates two fuel tanks, wherein (as described above) a first tank volume (1) extends under the rear bench of the motor vehicle, and a second tank volume (2) extends along the center region (20—FIG. 4). In order to also use the latter for fuel, the transverse stiffening (15) functions as an assembly part for inserting the tank into the second tank volume (2) as part of the pre-assembly. While this bottom tank preferably is lowered from above into the frame structure (10, 13, 14), the structure in the center of the vehicle can nevertheless also be designed inversely if the lower tank is to be removed downwardly.

The midfloor module (10-15) pre-assembled in this way is then inserted by screwing its frame structure (10, 13, 14) in the floor group and to the rocker panels of the motor vehicle. Finally the entire system surrounded by a housing trough is sealed with a lid.

The versatility of the proposed midfloor module (10-15) is underlined by the configuration according to FIG. 7. In this variant, the second tank volume (2) is smaller to spare sufficient space within the battery frame (10) for the terminal box (12) of the battery junction box (BJB). In the direction of travel, marked by a wide left-facing arrow facing down in accordance with the illustration, the cuboidal terminal box (12) is arranged centrally here upstream of the front transverse stiffening (15) and the second tank volume (2) of the frame structure (10, 13, 14).

The invention claimed is:

1. A midfloor module (10-15) for a motor vehicle, comprising:
   a frame structure (10, 13, 14) having battery frame (10);
   battery modules (11) in the battery frame (10); and
   tank volumes (1, 2, 2+) in the battery frame (10) and available for use by alternative energy stores, wherein the tank volumes (1, 2, 2+) comprise:
   a first tank volume (1) under a rear bench of the motor vehicle;
   a second tank volume (2) between the battery modules (11); and
   an additional volume (2+) in a midtunnel of the motor vehicle.

2. The midfloor module (10-15) of claim 1, wherein:
   the midfloor module (10-15) comprises a terminal box (12) for the battery modules (11); and
   the terminal box (12) is arranged upstream of the second tank volume (2) in a forward direction of travel.

3. The midfloor module (10-15) of claim 1, wherein:
   the frame structure (10, 13, 14) comprises a truss (13, 14); and
   the truss (13, 14) comprises a longitudinal structure (13) stiffened by the battery modules (11).

4. The midfloor module (10-15) of claim 3, wherein:
   the midfloor module (10-15) comprises transverse stiffenings (15); and
   the truss (13, 14) comprises a transverse structure (14) stiffened by the transverse stiffenings (15).

5. The midfloor module (10-15) of claim 1, wherein:
   the midfloor module (10-15) comprises a region (20) used optionally for the fuel or for further battery modules (11), and
   the region (20) comprises the second tank volume (2).

6. A method for manufacturing a motor vehicle, comprising:
   preassembling the midfloor module (10-15) of claim 5 wherein the region (20) is used for the fuel or further battery modules (11); and
   joining the pre-assembled midfloor module (10-15) into the motor vehicle.

7. The method of claim 6, wherein the joining is carried out by:
   screwing the pre-assembled midfloor module (10-15) into a floor group of the motor vehicle, or
   screwing the frame structure (10, 13, 14) to a rocker panel of the motor vehicle.

8. The method of claim 6, further comprising: inserting a tank into the second tank volume (2) during pre-assembly, and the insertion being carried out by a transverse stiffening (15) of the frame structure (10, 13, 14).

9. A motor vehicle, comprising:
   a floor group having a midtunnel,
   the floor group comprises a midfloor module (10-15) supporting the midtunnel of claim 1, and
   the motor vehicle tank bladder (2, 2+) filling the second tank volume (2) and the additional volume (2+).

* * * * *